V. H. SEARS.
SPRING SUSPENSION DEVICE FOR VEHICLES.
APPLICATION FILED DEC. 31, 1914.
1,139,909.
Patented May 18, 1915.
2 SHEETS—SHEET 2.
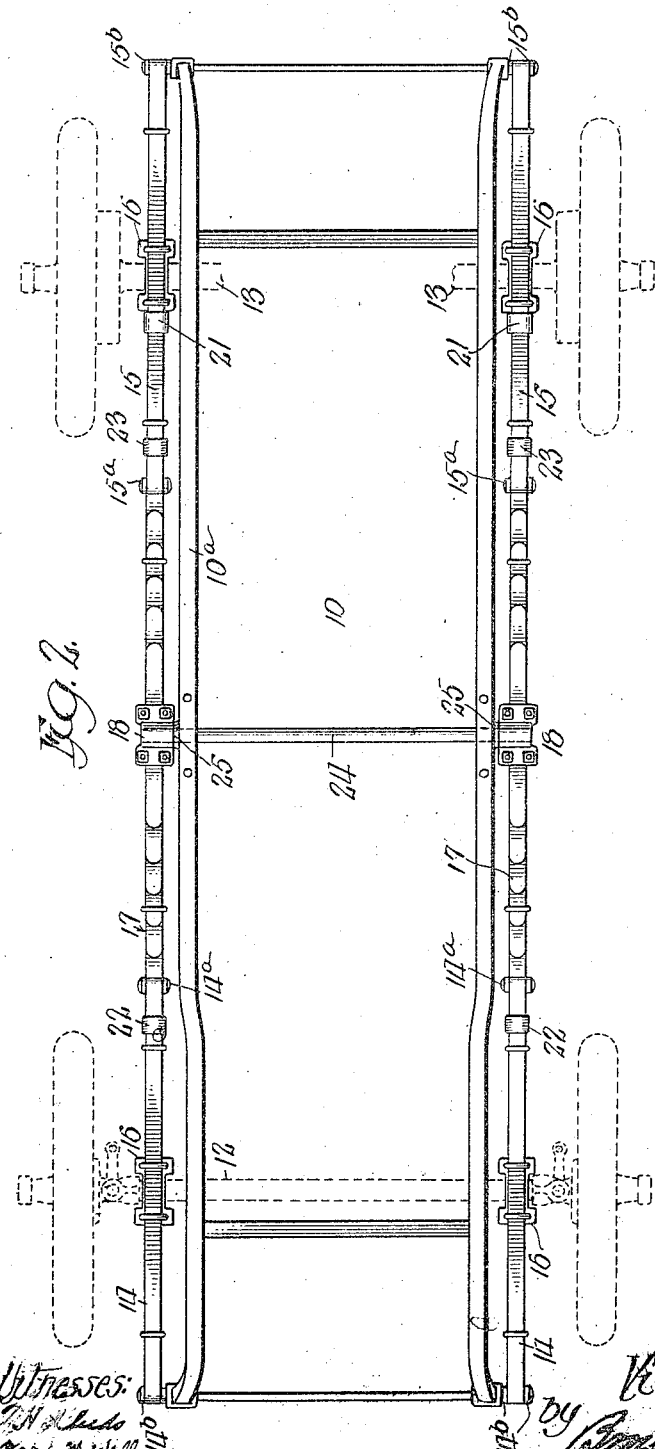
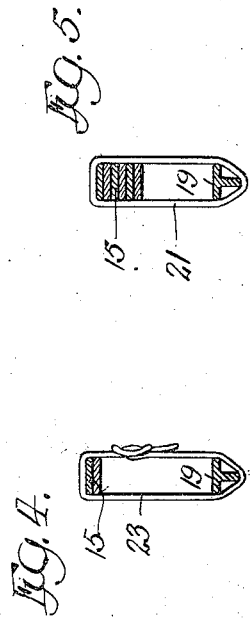
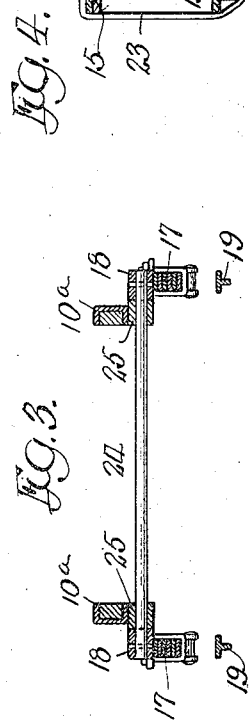
Inventor
Victor H. Sears.

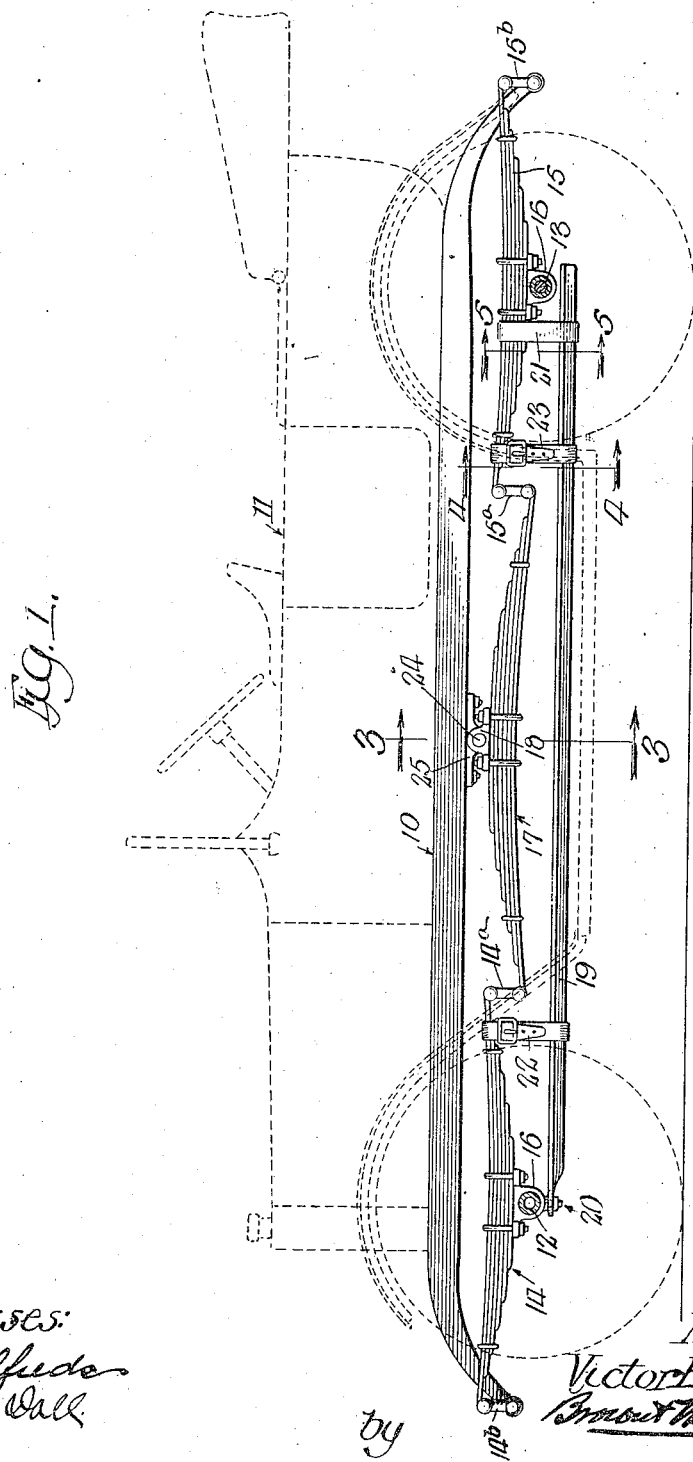

UNITED STATES PATENT OFFICE.

VICTOR H. SEARS, OF CHICAGO, ILLINOIS

SPRING SUSPENSION DEVICE FOR VEHICLES.

1,139,909.    Specification of Letters Patent.    Patented May 18, 1915.

Application filed December 31, 1914. Serial No. 879,827.

*To all whom it may concern:*

Be it known that I, VICTOR H. SEARS, a citizen of the United States, and a resident of Chicago, in the county of Cook and State of Illinois, have invented certain new and useful Improvements in Spring Suspension Devices for Vehicles; and I do hereby declare that the following is a full, clear, and exact description thereof, reference being had to the accompanying drawings, and to the letters of reference marked thereon, which form a part of this specification.

This invention relates to a spring suspension device for wheeled vehicles and consists of the matters hereinafter described and especially pointed out in the appended claims.

The invention relates particularly to an equalizing spring suspension device by means of which the wheels of a vehicle, such for example, as an automobile, are connected to the body of the vehicle and by means of which a shock or jar received by one wheel, as when passing over an obstruction or depression in the road, may be distributed through the body or body supporting frame of the vehicle so that the shock imparted to that part of the vehicle body above the said wheel and the resulting vertical movement will be proportionately reduced. My improved spring suspension device is so constructed and arranged that the advantages of the equalizing spring suspension device will be effected whether the load in the body is evenly distributed or not. This feature of the invention is of great advantage as will be manifest when it is remembered that in automobiles, for example, the greater load is more frequently placed over one wheel or one pair of wheels than over the others, as when the automobile is driven with one seat occupied by two or three persons and the other by one or by no one at all.

The various advantages of my invention will appear as I proceed with my specification.

In the drawings: Figure 1 is a view representing in dotted outline an automobile with the frame on which the car body is mounted and with my improved spring suspension device shown in full lines applied thereto. Fig. 2 is a top plan view of the frame and spring suspension device. Fig. 3 is a view representing a vertical section through Fig. 1 in a plane indicated by the lines 3—3 of Fig. 1. Fig. 4 is a vertical section through Fig. 1 in a plane indicated by the line 4—4 of Fig. 1. Fig. 5 is a vertical section through Fig. 1 in a plane indicated by the line 5—5 of Fig. 1.

My improved suspension device as shown herein is applied to an automobile, but it is apparent that the use of the device in this connection is not the only way in which it may be used, but that it may be applied with equal advantage to all wheeled vehicles. In addition, as illustrated, the said suspension device is applied at the sides of the vehicle only, that is to say, it is applied in such manner as to equalize and distribute shocks or jars longitudinally of the body of the vehicle or between the front and rear wheels at each side of the vehicle. Manifestly it may be applied in similar fashion at the front and rear of the vehicle to distribute the shock transversely of the body of the vehicle between the wheels on one side and the wheels on the other side.

Referring now to that embodiment of my invention illustrated in the drawings, 10 indicates the frame of the automobile and 11 indicates the body, which is mounted upon said frame in the usual and familiar manner.

12 designates the front axle of the automobile and 13 the rear axle.

The spring suspension device is duplicated on each side of the automobile so that a description of the said device on one side will suffice for both. As shown, said spring suspension device includes three springs, that is to say, front and rear upwardly facing half elliptical springs and an intermediate downwardly facing half elliptical spring. But it is to be understood that the said arrangement of springs is not essential and it may be replaced by any equivalent or similar arrangement of springs adapted to evenly distribute the force applied to either end of the set of springs throughout the frame member with which said springs are connected.

14 and 15 indicate half elliptical springs which are preferably of the usual leaf construction. Said springs face upwardly and the one, namely, the spring 14, is applied to the front axle and the other, namely, the spring 15, is applied to the rear axle, each being pivotally mounted on its respective axle by means of spring retaining blocks 16, so as to be capable of a rocking movement on the axle in a vertical plane parallel to the longitudinal axis of the body of the vehicle. Intermediate the two springs 14 and 15 is located a third half elliptical spring 17, which faces downwardly and which is pivotally connected at its middle point to the side bar 10ª of the frame 10 by means of a spring retaining block 18, in such manner as to be capable of a rocking movement in the vertical plane of the springs 14 and 15. The front and rear ends of the intermediate spring 17 are connected respectively to the proximate ends of the front spring 14 and of the rear spring 15 by means of pivotal links 14ª, 15ª. The front end of the spring 14 is connected to the forward end of the side bar 10ª by means of a pivotal link 14ᵇ and the rear end of the rear spring 15 is connected to the rear end of the said side bar 10ª by means of a pivotal link 15ᵇ.

The front and rear axles are connected at each side of the frame just inside the plane of the front and rear wheels and in the vertical plane of the springs 14, 15 and 17, by means of a truck member consisting of a longitudinally extending bar 19, there being such a bar included in each of the spring suspension devices. Said bar is connected to one axle, as shown, the front axle, by means of a pivoted bolt 20 fixed to the spring retaining block 16. Said bar is connected at its other end to the other axle, namely, the rear axle, by means of a strap 21 which engages at one end below the bar 19 and at the other end above the rear spring 15 near the part of the spring that is connected to the rear axle adjacent the spring retaining block 16 so as to lock said bar so far as its vertical movement is concerned to said rear axle. The connection of the rear end of the bar 19 to the rear axle is thus made in this indirect manner rather than in a direct manner as in the case of the front axle in order to provide for any possible longitudinal play between the front and rear axles, while at the same time causing the rear end of the bar 19 to correspond in its vertical movement with the vertical movement of the rear axle. The pivotal connection 20 at the front end of the bar 19 and the connection described at the rear end of said bar also takes care of any slight lateral movement of the front and rear wheels in a direction transverse of the car body.

22, 23 indicate straps which connect respectively the rear end of the front spring 14 and the forward end of the rear spring 15 with the rigid longitudinal bar 19. These straps will not prevent the said end of the said springs from approaching the bar 19, but each strap will prevent the said end from movement in an upward direction without carrying with it the part of the bar 19 with which it is connected, and thus through said bar, imparting a proportionate lifting effect to the axle or wheel with which said spring is connected.

The said straps 22, 23 prevent the frame bar 10ª from departing from a horizontal position when the vehicle is unevenly loaded, that is to say, it will prevent the bar 10ª from being depressed below a horizontal position in the neighborhood of the application of a heavier load to the vehicle body. For example, if the heavier load is applied to the front end of the vehicle, manifestly it would have a tendency to depress the forward end of the frame bar 10ª and with it the forward end of the front spring 14. This, however, would be prevented because a corresponding lifting of the rear end of the spring 14 would be prevented by the strap 22 connecting said rear end of the spring with the bar 19 which is connected with the front axle. Said strap also performs another function to be referred to later.

The operation of my improved spring suspension device is as follows. Suppose a jar is received by the front wheel of the vehicle, for example, when passing over a rock or other obstruction in the road. The result of this shock is to apply an impact to the said front wheel exerted in an upward direction to lift the front wheel and with it the adjacent end of the front axle. This impact is of a certain force and will be applied, by reason of the lever action of the several connected springs 14, 17 and 15 with the side frame bar 10ª in applying one half of said force to the front end of said side frame bar and the other half to the rear end of said side frame bar. This is manifest when it is remembered that the force exerted at the middle of the spring 14 is applied with equal lifting power to the front end of said spring and to the rear end of said spring, that applied to the front end being exerted directly on the front end of the said frame bar and that at the rear end of the spring being communicated through the lever spring 17 and the rear lever spring 15 with equal force in a lifting direction to the rear end of the rear spring 15 so as to impart an upward force against the rear end of the side frame member 10ª.

With the side frame bar equally loaded throughout, manifestly the movement and the result of the shock will be the same throughout the length of said bar. Suppose, however, that one part of the machine, for example, the front end of the machine, has a heavier load than the rear end of the machine. Under these circumstances, if the same force directed in an upward direction is applied to the front end of the machine as to the rear end of the machine, the upward impact would have less effect upon the front, heavier-loaded end of the machine than on the rear, less-loaded end of the machine, which would have considerable more movement imparted to it under the jar than the front end of the machine. The straps 22, 23, however, prevent this unequal effect in this way. For example, under the case submitted with the heavier load in the front end of the machine, the force of the impact imparted by the obstruction to the front wheel would be equally distributed and be applied equally to the front and rear ends of the side frame bar 10ª. The rear end of the frame bar, carrying a lighter load, would normally tend under this action to rise to a greater distance than the front end. The front end of the rear spring 15 would thus tend to be depressed a corresponding amount and this would result in a lowering of the rear end of the intermediate spring 17 and the raising of the front end of said spring a like amount. This, however, would be prevented by the strap 23 which connects the rear end of the forward spring 14 with the longitudinal bar 19, and thus the tendency to lift the rear end of the side frame bar more than the front end would be exerted through the strap 23 in a proportional upward lifting movement of the front axle 12. Thus, as will be manifest, the jar and the resulting vibrations of the body due to said jar would be equally distributed longitudinally through the side frame bar of the machine.

The straps 22, 23, while providing the necessary connection between the truck member 19 and the spring suspension device in order that said spring suspension device shall operate and perform its function as above described, at the same time in no way prevents the springs from accomplishing their normal functions as springs in relieving the jar to the frame member to which they are connected, since said springs are perfectly free to yield toward said truck member.

As shown the pivotal connection of the intermediate spring 17 through its associated spring block 18 is provided by a shaft 24 which extends transversely of the frame 10 and which is journaled in suitable bearing brackets 25 fixed to each frame member 10ª. This construction acts to tie the two suspension devices together and gives a stronger bearing for the spring suspension device at the middle of the vehicle frame.

While in describing my invention I have referred to certain details of construction and arrangement, it is to be understood that the invention is in no way limited except as pointed out in the appended claims.

I claim as my invention:

1. A spring suspension device for vehicles, comprising in combination with the vehicle body and the wheels on which said body is mounted, a frame member connected with the body and interposed between said body and two of the said wheels, an equalizing spring device interposed between said two wheels and said frame member, a truck member movable vertically with said two wheels, and means associated with each of said two wheels limiting the upward movement of said equalizing spring device intermediate its ends relative to said truck member but permitting free downward movement of said equalizing spring device intermediate its ends relative to said truck member.

2. A spring device for vehicles, comprising in combination with the vehicle body and the wheels on which said body is mounted, a frame member connected with the body and interposed between said body and two of said wheels, an equalizing spring device interposed between said two wheels and said frame member adapted to equally distribute the impact imparted to said two wheels over said frame member, a truck member connected to said two wheels in such manner that the two wheels may move laterally or longitudinally relative to said truck member but are immovable vertically with reference to said truck member, and means associated with each of said two wheels limiting the upward movement of said equalizing spring device intermediate its ends relative to said truck member but permitting free downward movement of said equalizing spring device intermediate its ends relative to said truck member.

3. A spring suspension device for vehicles comprising in combination with the vehicle body and the wheels on which said body is mounted, a frame member connected with the body and interposed between said body and two of the said wheels, an equalizing spring device interposed between said two wheels and said frame member, said equalizing device comprising a half elliptical upwardly facing spring associated with each wheel and pivotally connected at one end to said frame member, and an intermediate half elliptical downwardly facing spring pivotally connected intermediate its ends to said frame member and pivotally connected at its ends to said upwardly facing spring member, a truck member movable vertically with said two wheels, and means associated with each upwardly facing spring limiting the movement of its end adjacent said intermediate spring in an upward direction relative to said truck member but permitting free movement of said end in a downward direction relative to said truck member.

In testimony that I claim the foregoing as my invention I affix my signature in the presence of two witnesses, this 19th day of December A. D. 1914.

VICTOR H. SEARS.

Witnesses:
P. H. Ahrends,
Karl W. Dohr.